United States Patent [19]

Tokuyama

[11] Patent Number: 4,577,243

[45] Date of Patent: Mar. 18, 1986

[54] CONTROL SIGNAL GENERATING CIRCUIT FOR A MAGNETIC RECORDING AND/OR REPRODUCING APPARATUS

[75] Inventor: Yoshio Tokuyama, Yokohama, Japan

[73] Assignee: Victor Company of Japan, Ltd., Japan

[21] Appl. No.: 601,953

[22] Filed: Apr. 19, 1984

[30] Foreign Application Priority Data

Apr. 22, 1983 [JP] Japan ................................. 58-71145

[51] Int. Cl.[4] ..................... G11B 21/04; G11B 15/473
[52] U.S. Cl. ..................................... 360/70; 360/33.1; 360/73
[58] Field of Search ........................... 360/70, 73, 33.1

[56] References Cited

U.S. PATENT DOCUMENTS 4,268,873  5/1981  Koburi et al. ..................... 360/70 X
4,490,755 12/1984  Tokuyama .............................. 360/70
4,510,533  4/1985  Tokuyama ......................... 360/70 X
4,510,535  4/1985  Tokumitsu ........................ 360/70 X

OTHER PUBLICATIONS

Video Tape Recorders, Kybett, 1974, Howard W. Sams and Co., Inc., Indianapolis, Ind., pp. 157-158.

Primary Examiner—Raymond F. Cardillo, Jr.
Assistant Examiner—Steven R. Garland
Attorney, Agent, or Firm—Andrus, Sceales, Starke & Sawall

[57] ABSTRACT

A control signal generating circuit for a magnetic recording and/or reproducing apparatus comprises a monostable multivibrator for producing a pulse signal having a predetermined pulse width in response to a reference signal from a supplying circuit of the recording and/or reproducing apparatus, a flip-flop circuit responsive to the output pulse signal of the monostable multivibrator, for inverting an output thereof every time the pulse signal is supplied thereto, and an OR gate for producing a control signal responsive to the output pulse signal of the monostable multivibrator and the output of the flip-flop circuit, and for supplying the control signal to a control head, of the recording and/or reproducing apparatus, which records and/or reproduces the control signal on and/or from a magnetic tape.

7 Claims, 11 Drawing Figures

CONTROL SIGNAL GENERATING CIRCUIT FOR A MAGNETIC RECORDING AND/OR REPRODUCING APPARATUS

BACKGROUND OF THE INVENTION

The present invention generally relates to control signals generating circuits for magnetic recording and/or reproducing apparatuses, and more particularly to a control signal generating circuit for an apparatus which magnetically records and/or reproduces a video signal. The control signal generating circuit according to the present invention generates a control signal by use of a vertical synchronizing signal which is separated from the video signal, and is designed so facilitate the manufacturing of the control signal generating circuit in the form of an integrated circuit.

Generally, an apparatus for magnetically recording and/or reproducing a video signal, comprises a control signal generating circuit. The control signal generating circuit generates a control signal during a recording mode, and this control signal is recorded on a control track of a magnetic tape. The control signal is used as a reference signal for controlling the rotation of rotary heads, for example. The control signal which is recorded on the magnetic tape, is reproduced during a reproducing mode and is used as a reference signal for controlling the rotation of a capstan, for example. In a case where the video signal is of the NTSC system, for example, this type of control signal generating circuit obtains a control signal having a frequency of 30 Hz, by separating a vertical synchronizing signal having a frequency of 60 Hz from the video signal and frequency-dividing the separated vertical synchronizing signal by ½.

As a conventional control signal generating circuit, there was a control signal generating circuit comprising the so-called CR monostable multivibrator circuit. This CR monostable multivibrator circuit included a capacitor and a resistor for determining a time constant for the purpose of frequency-dividing by ½ the vertical synchronizing signal which is separated from the video signal. However, when manufacturing this CR monostable multivibrator circuit in the form of an integrated circuit, the capacitor and the resistor had to be coupled externally of the integrated circuit, and there were disadvantages in that an integrated circuit should have many number of pins including a pin to be connected with the external capacitor and resister the control signal generating circuit as a whole could not be manufactured in the form of an integrated circuit. Further, there was another disadvantage in that the CR monostable multivibrator circuit included a large number of circuit elements.

As another example of a conventional control signal generating circuit, there was a control signal generating circuit comprising a digital pulse counting monostable multivibrator for frequency-dividing the separated vertical synchronizing signal by ½. The digital pulse counting monostable multivibrator included a crystal oscillator, and generated a control signal having a frequency of 30 Hz responsive to the vertical synchronizing signal supplied thereto by counting the pulses from the crystal oscillator. However, the cost of this other conventional control signal generating circuit became high, due to the provision of the expensive crystal oscillator. Further, approximately ten to twenty stages of counters were required to count the pulses from the crystal oscillator, and it was therefore impossible to manufacture the control signal generating circuit at a low cost.

SUMMARY OF THE INVENTION

Accordingly, it is a general object of the present invention to provide a novel and useful control signal generating circuit for a magnetic recording and/or reproducing apparatus, in which the disadvantages described heretofore have been overcome.

Another and more specific object of the present invention is to provide a control signal generating circuit for a magnetic recording and/or reproducing apparatus, which is designed so facilitate the manufacturing of the control signal generating circuit in the form of an integrated circuit. According to the control signal generating circuit of the present invention, the circuit can be manufactured in the form of an integrated circuit with a small number of pins. Further, the control signal generating circuit according to the present invention comprises only a small number of circuit elements, and it is therefore possible to manufacture the circuit at a low cost.

Other objects and further features of the present invention will be apparent from the following detailed description when read in conjunction with the accompanying drawings.

DETAILED DESCRIPTION

Figure 1:
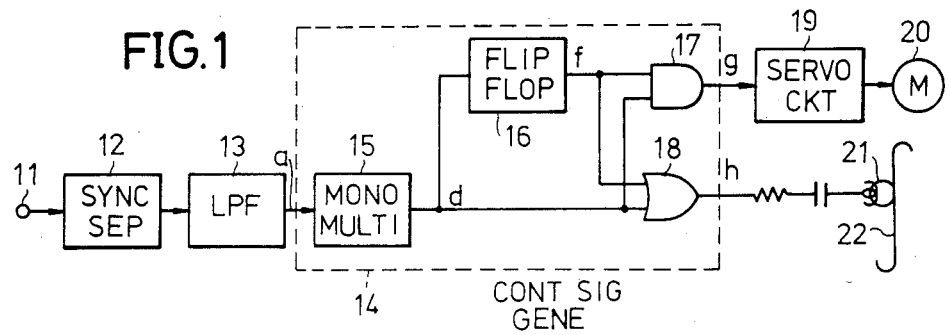
FIG. 1 is a systematic block diagram showing a part of an example of a magnetic recording and/or reproducing apparatus which is provided with an embodiment of a control signal generating circuit according to the present invention.

In FIG. 1, a video signal is applied to an input terminal 11. This video signal is supplied to a synchronizing signal separating circuit 12 wherein a vertical synchronizing signal having a frequency of 60 Hz is separated. The separated vertical synchronizing signal is passed through a lowpass filter 13 wherein the signal is formed into a signal a shown in FIG. 2(A). This signal a is supplied to a monostable multivibrator 15 within a control signal generating circuit 14 according to the present invention which has been made in the form of an integrated circuit (IC). The monostable multivibrator 15 is triggered by the signal a, and produces a signal d shown in FIG. 2(D) which has a pulse width of 2 msec., for example. The signal d is supplied to a flip-flop circuit 16, one input terminal of a 2-input AND gate 17, and one input terminal of a 2-input OR gate 18. The flip-flop circuit 16 produces a signal f shown in FIG. 2(F) which has a pulse width of 1/60 sec. ($\approx$ 16.7 msec.). This signal f is supplied to the other input terminal of the AND gate 17 and to the other input terminal of the OR gate 18.

Figure 2:
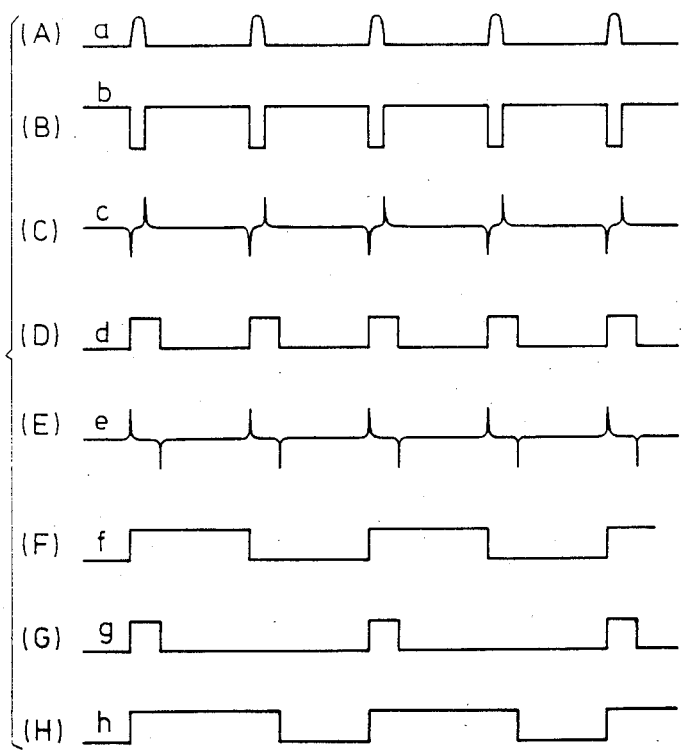
FIGS. 2(A) through 2(H) show signal waveforms for explaining the operation of the control signal generating circuit according to the present invention.

The AND gate 17 produces a signal g shown in FIG. 2(G) which has a frequency of 30 Hz, responsive to the signals d and f supplied thereto. The signal g is supplied to a known motor servo circuit 19 which controls a head motor 20 to rotate rotary heads (not shown) at a rotational speed of 30 rps. The OR gate 18 produces a signal h shown in FIG. 2(H) having a frequency of 30 Hz, responsive to the signals d and f supplied thereto. This signal h is supplied to a control head 21 which records the signal h on a control track of a magnetic tape 22 as a control signal. When the signal h is recorded by the control head 21, the signal h is recorded in the form of a differentiated pulse which assumes positive and negative polarities in response to the leading and trailing edges of the signal h. At the time of the reproduction, only the positive polarity pulse of the control signal which has been recorded, which is responsive to the leading edge of the signal h, is used as the control signal.

The control signal generating circuit 14 according to the present invention has a simple circuit construction and comprises the monostable multivibrator 15, the flip-flop circuit 16, the AND gate 17, and the OR gate 18. Thus, compared to the conventional control signal generating circuit, the control signal generating circuit 14 can be manufactured in the form of an integrated circuit more easily and at a low cost.

Figure 3:
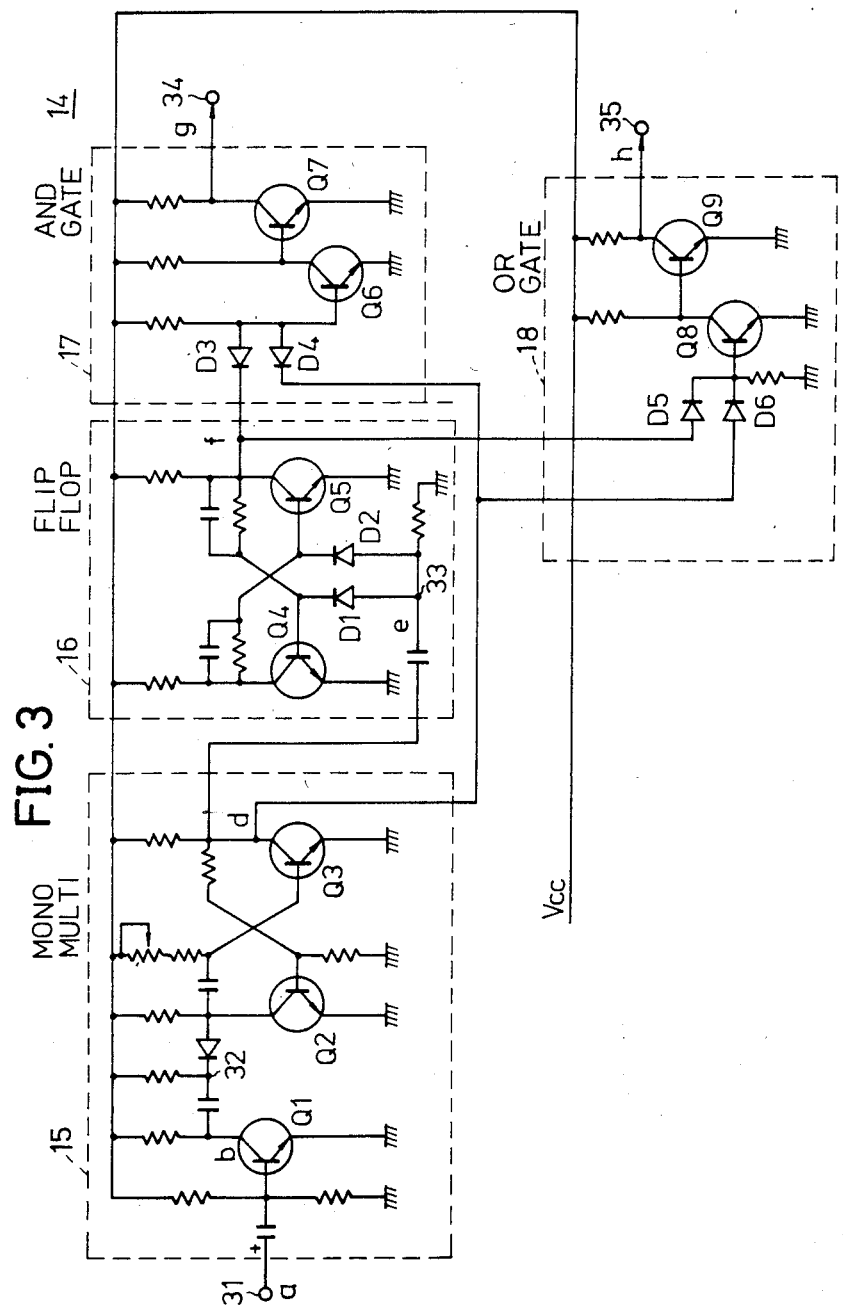
FIG. 3 is a circuit diagram showing an embodiment of a discrete circuit construction of the control signal generating circuit shown in FIG. 1.

FIG. 3 shows an embodiment of a discrete circuit construction of the control signal generating circuit 14 shown in FIG. 1. In FIG. 3, those constituting circuit parts which are equivalent to those corresponding parts in FIG. 1, are shown in phantom blocks and designated by the same reference numerals.

The signal a from the lowpass filter 13 is applied to an input terminal 31. The signal a is thus supplied to the monostable multivibrator 15 including transistors Q1 through Q3. A signal b shown in FIG. 2(B) is obtained through a collector of the transistor Q1, and a signal c shown in FIG. 2(C) is obtained at a connection point 32. The signal d is obtained through a collector of the transistor Q3. This signal d is supplied to the flip-flop circuit 16 including transistors Q4 and Q5, the AND gate 17 including transistors Q6 and Q7, and the OR gate 18 including transistors Q8 and Q9. A signal e shown in FIG. 2(E) which is a differentiated signal of the signal d, is obtained at a connection point 33 within the flip-flop circuit 16. The signal e is passed through diodes D1 and D2, and only positive polarity pulses of the signal e are applied to respective bases of the transistors Q4 and Q5.

The signal f is obtained through a collector of the transistor Q5 in the flip-flop circuit 16. This signal f is applied to a base of the transistor Q6 within the AND gate 17, through a diode D3 coupled in the reverse direction. The signal f is also applied to a base of the transistor Q8 within the OR gate 18, through a diode D5 which is coupled in the forward direction. In addition, the signal d from the monostable multivibrator 15 is applied to a base of the transistor Q6 within the AND gate 17, through a diode D4 coupled in the reverse direction. This signal d is also applied to a base of the transistor Q8 within the OR gate 18, through a diode D6 coupled in the forward direction. The signal g is obtained through a collector of the transistor Q7 within the AND gate 17, and is supplied to the servo circuit 19 through a terminal 34. The signal h is obtained through a collector of the transistor Q9 within the OR gate 18, and is supplied to the control head 21 through a terminal 35.

Those skilled in the art can easily design the control signal generating circuit 14 shown in FIG. 3 in the form of an integrated circuit which performs an equivalent operation. For this reason, the illustration and description of the integrated circuit will be omitted in the present specification.

Figure 4:
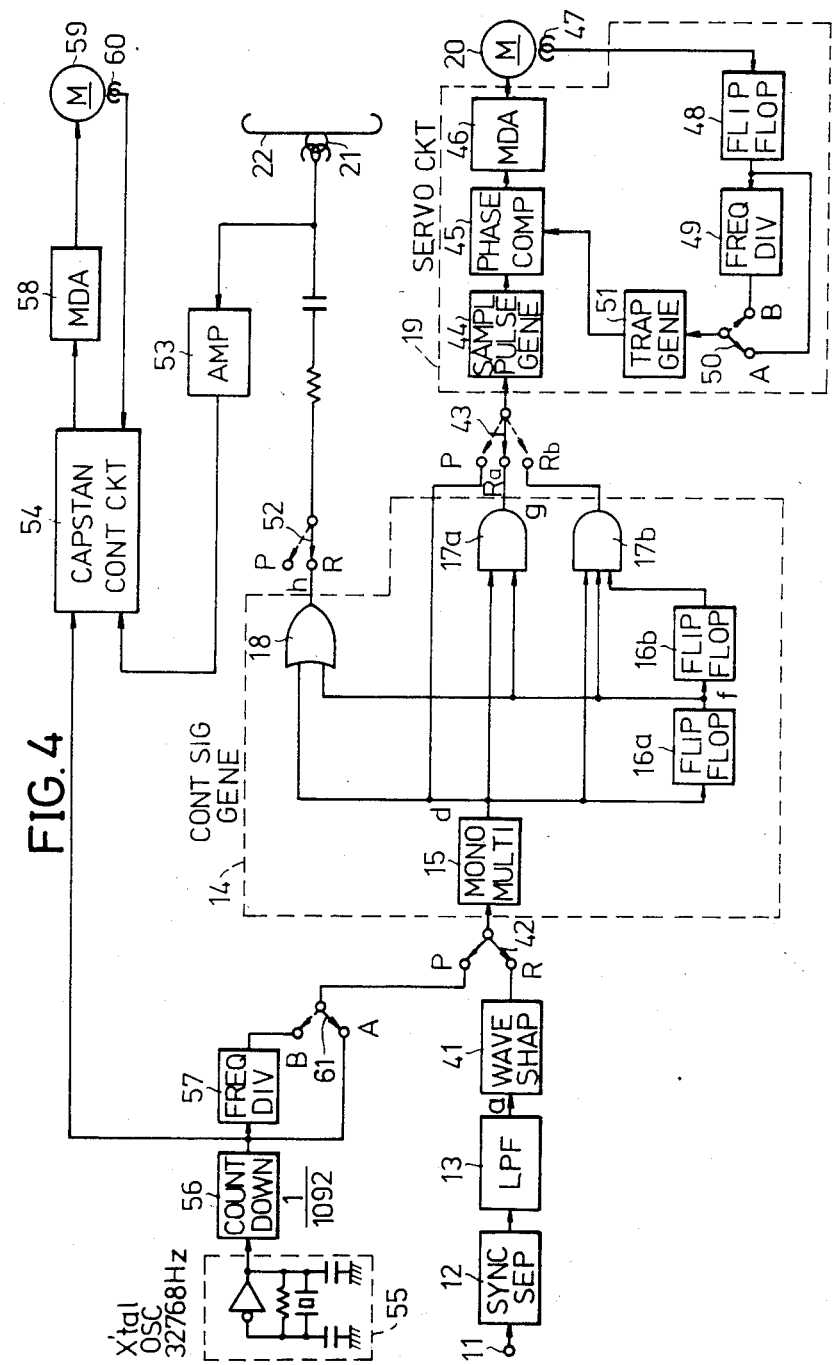
FIG. 4 is a systematic block diagram showing an essential part of another example of a magnetic recording and/or reproducing apparatus which is provided with another embodiment of a control signal generating circuit according to the present invention.

Description will now be made with respect to another embodiment of a control signal generating circuit according to the present invention, by referring to FIG. 4. In the present embodiment, the control signal generating circuit is designed to be used in common with respect to a magnetic recording and/or reproducing apparatus in which the rotary heads are rotated at a speed of 30 rps and a magnetic recording and/or reproducing apparatus in which the rotary heads are rotated at a speed of 45 rps. The magnetic recording and/or reproducing apparatus in which the rotary heads are rotated at the speed of 30 rps, is the normal video signal magnetic recording and/or reproducing apparatus in which a video signal of one field is recorded on one track on the magnetic tape, by wrapping the magnetic tape obliquely around the peripheral surface of a drum which has a pair of rotary heads, over an angular range slightly larger than 180°. On the other hand, the magnetic recording and/or reproducing apparatus in which the rotary heads are rotated at the speed of 45 rps, is the compact type video signal magnetic recording and/or reproducing apparatus in which the video signal of one field is recorded on one track on the magnetic tape, by wrapping the magnetic tape obliquely around the peripheral surface of a drum which has four rotary heads and has a relatively small diameter, over an angular range slightly larger than 270°. In FIG. 4, those parts which are the same as those corresponding parts in FIG. 1 are designated by the same reference numerals, and their description will be omitted.

The vertical synchronizing signal a which has been separated in the synchronizing signal separating circuit 12 and passed through the lowpass filter 13, is subjected to a wave-shaping in a wave-shaping circuit 41. An output signal of the wave-shaping circuit 41 is supplied to the monostable multivibrator 15 within the control signal generating circuit 14, through a switch 42 which is connected to a terminal R during the recording mode. The output signal d of the monostable multivibrator 15 is supplied to a flip-flop circuit 16a, one input terminal of a 2-input AND gate 17a, a first input terminal of a 3-input AND gate 17b, a terminal P of a switch 43, and one input terminal of the OR gate 18. The output signal f of the flip-flop circuit 16a is supplied to a flip-flop circuit 16b, the other input terminal of the AND gate 17a, a second input terminal of the AND gate 17b, and the other input terminal of the OR gate 18. A signal having a frequency which is ½ the frequency of the signal f, is obtained from the flip-flop circuit 16b and supplied to a third input terminal of the AND gate 17b.

When the circuit shown in FIG. 4 is used in the magnetic recording and/or reproducing apparatus in which the rotary heads are rotated at the speed of 30 rps, the switch 43 is switched between terminals Ra and P. Further, switches 50 and 61 are connected to respective terminals A. During the recording mode, switches 42 and 52 are connected to respective terminals R, and the switch 43 is connected to the terminal Ra.

The signal g produced from the AND gate 17a is supplied to a sampling pulse generating circuit 44 within the servo circuit 19, and output sampling pulses of the sampling pulse generating circuit 44 are supplied to a phase comparator 45. Pulses from a pickup head 47 which operates together with a magnet located on a rotary shaft of the motor 20, are supplied to a flip-flop 48. An output signal of the flip-flop 48 is supplied to a ½-frequency divider 49, and also to a trapezoidal wave generating circuit 51 through the switch 50 which is connected to the terminal A. A trapezoidal wave which is generated from the trapezoidal wave generating circuit 51 is supplied to the phase comparator 45, and sampled by the sampling pulses from the sampling pulse generating circuit 44. An output error signal of the phase comparator 45, is applied to the motor 20 through a motor driving amplifier 46, so as to control the rotation of the motor 20.

On the other hand, the output signal h of the OR gate 18 is supplied to the control head 21 through the switch 52 which is connected to the terminal R, and is recorded on the magnetic tape 22 as the control signal. In addition, the signal h is supplied to a capstan control circuit 54 having a known construction, through an amplifier 53. An output signal of a crystal oscillator 55 which oscillates at a frequency of 32768 Hz, is counted down by 1/1092 in a count down circuit 56, into a signal having a frequency of 30 Hz. This signal having the frequency of 30 Hz is supplied to the capstan control circuit 54, a ½-frequency divider 57, and the terminal A of the switch 61. An output signal of the capstan control circuit 54 is supplied to a capstan motor 59 through a motor driving amplifier 58, so as to control the rotation of the capstan motor 59. A signal from a pickup head 60, which is dependent on the rotational speed of the motor 59, is supplied to the capstan control circuit 54 and used for the purpose of generating the control signal.

When the magnetic recording and/or reproducing apparatus assumes the reproducing mode, the switches 42, 43, and 52 are connected to the respective terminals P. Accordingly, the output signal of the count down circuit 56 is supplied to the monostable multivibrator 15 through the switches 61 and 42. The output signal of the monostable multivibrator 15 is supplied to the sampling pulse generating circuit 44, through the switch 43. As a result, a control operation is carried out with respect to the motor 20. In addition, the control signal which is reproduced from the magnetic tape 22 by the control head 21, is supplied to the capstan control circuit 54 through the amplifier 53 and used to control the rotation of the capstan motor 59.

On the other hand, when the circuit shown in FIG. 4 is used in the magnetic recording and/or reproducing apparatus in which the rotary heads are rotated at the speed of 45 rps, the switch 43 is switched between terminals Rb and P. Further, the switches 50 and 61 are connected to respective terminals B. During the recording mode, the switches 42 and 52 are connected to respective terminals R, and the switch 43 is connected to the terminal Rb.

A square wave signal which has a frequency of 15 Hz and is obtained from the AND gate 17, is supplied to the sampling pulse generating circuit 44 through the switch 43. In addition, a signal which has a frequency of 45 Hz and is obtained from the pickup head 47, is supplied to the ½-frequency divider 49 through the flip-flop 48, and is frequency divided by ½. A signal which has a frequency of 15 Hz and is produced from the ½-frequency divider 49, is supplied to the trapezoidal wave generating circuit 51 through the switch 50. The operations of the remaining circuit parts are the same as those in the above described case where the circuit shown in FIG. 4 is used in the magnetic recording and/or reproducing apparatus in which the rotary heads are rotated at the speed of 30 rps, and description of these operations will be omitted.

During the reproducing mode, the switches 42, 43, and 52 are connected to the respective terminals P. Accordingly, the output signal of the count down circuit 56, which has been frequency-divided by ½ in the ½-frequency divider 57 and accordingly has a frequency of 15 Hz, is supplied to the monostable multivibrator 15 through the switches 61 and 42. The output signal of the monostable multivibrator 15 is supplied to the sampling pulse generating circuit 44 through the switch 43. The operations of the remaining circuit parts are the same as those in the above described case where the circuit shown in FIG. 4 is used in the magnetic recording and/or reproducing apparatus in which the rotary heads are rotated at the speed of 30 rps, and description of these operations will be omitted.

Further, the present invention is not limited to these embodiments, but various variations and modifications may be made without departing from the scope of the present invention.

What is claimed is:

1. A control signal generating circuit for a magnetic recording and/or reproducing apparatus, said recording and/or reproducing apparatus having supplying means for supplying a reference signal, and a control head for recording and/or reproducing a control signal on and/or from a magnetic tape, said control signal generating circuit comprising:
    a monostable multivibrator for producing a pulse signal having a predetermined pulse width in response to said reference signal from said supplying means;
    a flip-flop circuit responsive to the output pulse signal of said monostable multivibrator, for inverting an output thereof every time said pulse signal is supplied thereto; and
    an OR gate for producing a control signal responsive to the output pulse signal of said monostable multivibrator and the output of said flip-flop circuit, and for supplying said control signal to said control head.

2. A control signal generating circuit as claimed in claim 1 in which said recording and/or reproducing apparatus further has a motor and a control circuit for controlling the rotation of said motor, and said control signal generating circuit further comprises an AND gate for producing another control signal responsive to the output pulse signal of said monostable multivibrator and the output of said flip-flop circuit, and for supplying said other control signal to said control circuit.

3. A control signal generating circuit as claimed in claim 1 in which said monostable multivibrator, said flip-flop circuit, said OR gate, and said AND gate assume the form of an integrated circuit.

4. A control signal generating circuit as claimed in claim 1 in which said supplying means of said recording and/or reproducing apparatus comprises separating means for separating a vertical synchronizing signal from a video signal which is to be recorded, and means for supplying said vertical synchronizing signal to said monostable multivibrator during a recording mode of said recording and/or reproducing apparatus.

5. A control signal generating circuit as claimed in claim 1 in which said supplying means of said recording and/or reproducing apparatus comprises a reference oscillator for producing a signal having a constant frequency, frequency de-multiplying means for frequency-de-multiplying the output signal of said reference oscillator into said reference signal having a predetermined frequency, and means for supplying said reference signal to said monostable multivibrator during a reproducing mode of said recording and/or reproducing apparatus.

6. A control signal generating circuit for a magnetic recording and/or reproducing apparatus, said recording and/or reproducing apparatus having supplying means for supplying a reference signal, a control head for recording and/or reproducing a control signal on and/or from a magnetic tape, a motor, and a control circuit for controlling the rotation of said motor, said control signal generating circuit comprising:

- a monostable multivibrator for producing a pulse signal having a predetermined pulse width in response to said reference signal from said supplying means;
- a first flip-flop circuit responsive to the output pulse signal of said monostable multivibrator, for inverting an output thereof every time said pulse signal is supplied thereto;
- a second flip-flop circuit supplied with the output of said first flip-flop circuit;
- an OR gate for producing a first control signal responsive to the output pulse signal of said monostable multivibrator and the output of said first flip-flop circuit, and for supplying said first control signal to said control head;
- a first AND gate for producing a second control signal responsive to the output pulse signal of said monostable multivibrator and the output of said first flip-flop circuit;
- a second AND gate for producing a third control signal responsive to the output pulse signal of said monostable multivibrator and an output of said second flip-flop circuit; and
- means for selectively supplying the outputs of said first and second AND gates to said control circuit.

7. A control signal generating circuit as claimed in claim 6 in which said monostable multivibrator, said first and second flip-flop circuits, said OR gate, and said first and second AND gates assume the form of an integrated circuit.

* * * * *